United States Patent [19]

Iida

[11] 4,165,354

[45] Aug. 21, 1979

[54] PROCESS FOR PRODUCING PLASTIC PIPES HAVING OVAL CROSS-SECTIONAL SHAPE

[75] Inventor: Noboru Iida, Ohtsu, Japan

[73] Assignee: Sekisui Kagaku Kogyo Kabushiki Kaisha, Osaka, Japan

[21] Appl. No.: 824,953

[22] Filed: Aug. 15, 1977

[30] Foreign Application Priority Data

Aug. 19, 1976 [JP] Japan .................................. 51-99403

[51] Int. Cl.² .......................... D01D 5/08; D01D 5/24
[52] U.S. Cl. ........................... 264/178 R; 264/177 R; 264/209; 264/237; 264/280
[58] Field of Search ................ 264/177 R, 178 R, 237, 264/280, 209; 425/376 R

[56] References Cited

U.S. PATENT DOCUMENTS

| 1,740,029 | 12/1929 | Moomy | 264/237 |
| 2,375,827 | 5/1945 | Slaughter | 264/177 R |
| 2,451,986 | 10/1946 | Slaughter | 264/177 R |
| 3,057,013 | 10/1962 | Loveless | 264/178 R |
| 3,296,661 | 1/1967 | Moustier | 264/177 R |
| 3,679,435 | 7/1972 | Klenk et al. | 264/290 T |
| 3,787,552 | 1/1974 | Spencer et al. | 264/178 R |
| 3,812,230 | 5/1974 | Takabushi | 264/237 |

FOREIGN PATENT DOCUMENTS 1814573  12/1969  Fed. Rep. of Germany ...... 264/177 R

*Primary Examiner*—Jay H. Woo
*Attorney, Agent, or Firm*—Wenderoth, Lind & Ponack

[57] ABSTRACT

A process for producing a plastic pipe having an oval cross-sectional shape with a high dimensional precision, which comprises conducting a roughly shaped plastic pipe having an oval cross-sectional shape, which is in the softened state and composed of a large-diameter portion, a small-diameter portion and transitional portions connecting them to each other, to a cooling tank while its shape is adjusted by being passed through a forming tube with its large-diameter portion down; cooling the form-adjusted plastic pipe in the cooling tank by dipping the large-diameter portion or both the large diameter portion and a part of the transitional portions contiguous thereto in a cooling bath; and subjecting that portion of the form-adjusted plastic pipe which is out of the cooling bath to a shower of a cooling liquid. This plastic pipe is useful for a drainage or sewage system.

6 Claims, 3 Drawing Figures

PROCESS FOR PRODUCING PLASTIC PIPES HAVING OVAL CROSS-SECTIONAL SHAPE

This invention relates to a process for producing a plastic pipe having an oval cross-sectional shape (which will be sometimes abbreviated below as an oval plastic pipe).

When an oval plastic pipe is set in position so that in its cross-section, the major axis extends perpendicularly and the large-diameter portion is situated at its upper part, a drainage or sewage which flows through the pipe is deeper than in conventional plastic pipes having a circular cross-sectional shape, and the precipitation and accumulation of solids in the drainage or sewage can be prevented. This is hydraulically advantageous, and the application of such an oval plastic pipe to a drainage or sewage system is being investigated.

As compared with ordinary plastic pipes having a circular cross-section, the oval plastic pipes produced by an extrusion-molding technique tend to become non-uniform in dimension and shape by the effect of the pressure of cooling water in a cooling tank, and predetermined shapes and sizes are difficult to obtain.

It is an object of this invention therefore to provide a process for easily producing oval plastic pipes having a high dimensional precision.

The present invention thus provides a process for producing a plastic pipe having an oval cross-sectional shape with a high dimensional precision, which comprises conducting a roughly shaped plastic pipe having an oval cross-sectional shape, which is in the softened state and composed of a large-diameter portion, a small-diameter portion and transitional portions connecting them to each other, to a cooling tank while its shape is adjusted by being passed through a forming tube with its large-diameter portion down; cooling the form-adjusted plastic pipe in the cooling tank by dipping the large-diameter portion or both the large diameter portion and a part of the transitional portions contiguous thereto in a cooling bath; and subjecting that portion of the form-adjusted plastic pipe which is out of the cooling bath to a shower of a cooling liquid.

In the present application, the "oval plastic pipe" means a pipe having an oval cross-sectional shape which is made of various thermoplastic resins such as rigid polyvinyl chloride.

Preferred embodiments of the present invention are described below by reference to the accompanying drawings in which.

Figure 1:
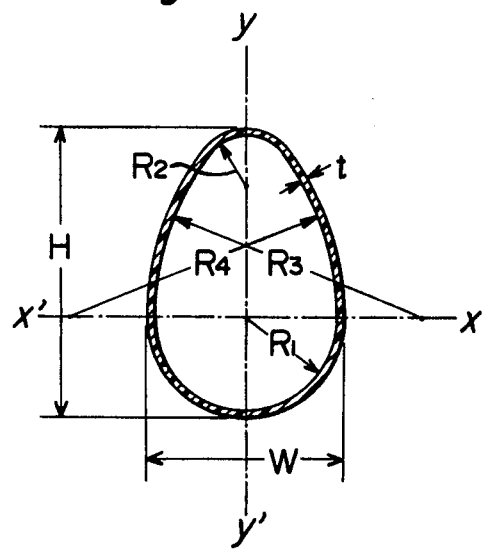
FIG. 1 is a cross-sectional view of one example of an oval plastic pipe produced by the process of this invention.

As shown in FIG. 1, the contour of an oval plastic pipe produced by the process of this invention is composed of an arcuate portion having a radius $R_1$ of curvature (termed a large-diameter portion), an arcuate portion having a radius $R_2$ of curvature (termed a small diameter portion), and arcuate portions having radii $R_3$ and $R_4$ of curvature (termed transitional portions). $R_1$, $R_2$, $R_3$ and $R_4$ have the relation $R_2 < R_1 < R_3 = R_4$. The curvature centers of the large-diameter portion and the small-diameter portion are both located on the major axis y-y', and the curvature centers of the transitional portions are located on the axis x-x' which crosses the major axis y-y' at right angles.

Figure 2:
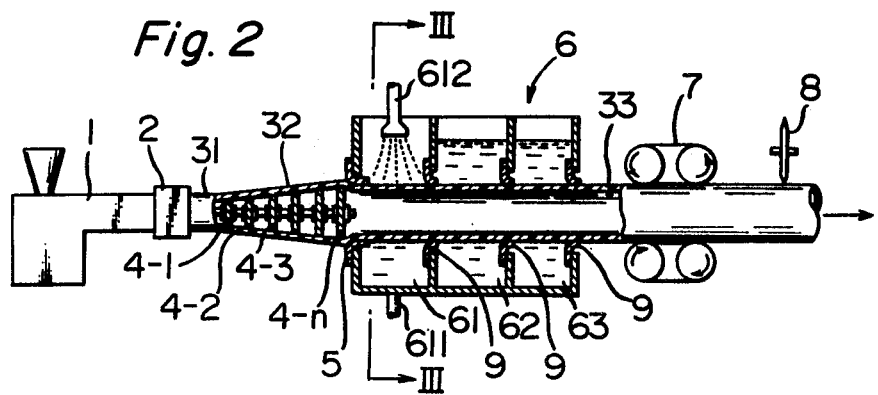
FIG. 2 is a partly cross-sectional side elevation illustrating the process steps of the process of this invention.

Referring to FIG. 2, a thermoplastic resin kneaded and melted in an extruder 1 is continuously extruded as a plastic pipe 31 having a circular cross-section from a die 2 fitted to the tip of the extruder. While still in the softened state, the pipe 31 is transformed into a roughly shaped oval pipe 32 by being gradually deformed by a plurality of inner rings 4-1, 4-2, 4-3, . . . , 4-n fitted inside the pipe. The inner rings 4-1, 4-2, 4-3, . . . , 4-n have such contours that they progressively change from a circular shape to an oval shape in the pipe conveying direction, and are so aligned that the large-diameter portion of the pipe is at the bottom part. The inner ring 4-n which is nearest to a forming tube 5 has an outside diameter slightly larger than the inside diameter of the desired oval plastic pipe 33 so that the periphery of the roughly shaped oval pipe 32 well makes contact with the inner circumferential surface of the forming tube 5.

In the embodiment shown, the plastic pipe 31 having a circular cross-section is extruded from the die 2 and then gradually deformed into the roughly shaped oval pipe 32. Alternatively, a roughly shaped oval pipe can be directly extruded from a die having an extrusion slit with an oval contour. The die of this type, however, is generally expensive.

The roughly shaped oval pipe 32 is then conducted to a cooling bath 6 via the forming tube 5. The forming tube 5 serves to adjust the contour of the desired oval plastic pipe 33. In order that after cooling and shrinking, the oval plastic pipe 33 of the desired outside diameter may be formed, the forming tube 5 has an inside diameter larger than the outside diameter of the oval plastic pipe 33 by a dimension corresponding to the shrunken size. The structure of the forming tube 5 is not particularly limited. It is advisable however to increase the adhesion of the forming tube 5 to the peripheral surface of the roughly shaped oval plastic tube 32 by providing grooves in the circumferential direction on the inner circumferential surface of the forming tube 5 which contacts the peripheral surface of the roughly shaped oval plastic pipe 32 being conveyed, and connecting these grooves to a pressure-reducing device to evacuate them. The adhesion further increases if a small amount (several grams per hour) of an oil such as kerosene is fed between the inside circumferential surface of the forming tube 5, and the peripheral surface of the pipe 32 to form a lubricating coating.

The cooling tank 6 consists of three members aligned in the pipe conveying direction. A first cooling tank 61 includes an overflowing tube 611 which maintains the water level of the cooling bath at a certain point so that the large-diameter portion or both the large diameter portion and a part of the transitional portions contiguous thereto of the oval plastic pipe 33 which is being conveyed while its form is adjusted by the forming tube 5 may be dipped in the cooling bath. Above the cooling tank 61 is provided a nozzle 612 for spraying a shower of cooling water so as to cool that part of the oval plastic pipe 33 which is out of the cooling bath (that is, the small-diameter portion and at least part of the transitional portions contiguous thereto) may be cooled with the shower of water.

A cooling bath is filled in a second cooling tank 62 contiguous to the first cooling tank 61 and in a third cooling tank 63 contiguous to the second cooling tank 62. The oval plastic pipe 33 which has been substantially cooled in the cooling tank 61 in the manner described is then passed through the cooling tanks 62 and 63 while being sealed by sealing members 9 provided on the walls of the tanks. Then, it leaves the tank, and is taken up by a take-up device 7 and cut to the desired lengths by a cutting device 8.

The second and third cooling tanks 62 and 63 serve to supplement the cooling of the oval plastic pipe 33 by the first cooling tank 61, and are not essential.

Figure 3:
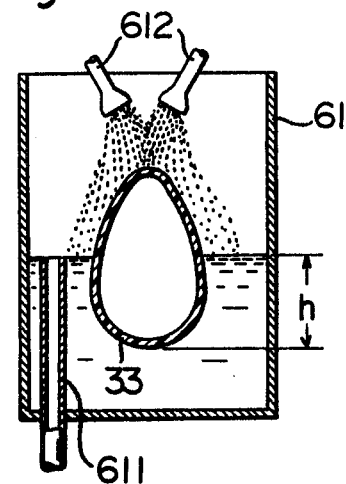
FIG. 3 is a sectional view along the line III—III of FIG. 2.

As stated, the water level of the cooling bath in the first cooling tank 61 is controlled by the overflowing tube 611 so that the large-diameter portion of the oval plastic pipe 33 or both the large-diameter portion and a part of the transitional portions contiguous thereto may be dipped. Preferably, the water level of the cooling bath is adjusted so that both the large-diameter portion and a part of the transitional portions contiguous thereto may be dipped. More specifically, with reference to FIGS. 3 and 1, the dipping depth h of the oval plastic pipe 33 in the cooling bath in the cooling tank 61 is adjusted to 1.0 $R_1$ to 1.5 $R_1$, especially 1.2 $R_1$ to 1.3 $R_1$, and that portion of the pipe 33 which is out of the cooling bath is cooled by a shower of water. This can reduce the strain remaining in the wall of the pipe.

If the oval plastic pipe 33 from the forming tube 5 is entirely dipped in the cooling bath, the pipe wall which is still in the softened state will be affected by the water pressure of the cooling bath, and the transitional portions will swell (namely, $R_3$ and $R_4$ increase). Consequently, the shapes and dimensions of the transitional portions and the small-diameter portion will not conform to the predetermined ones. If, on the other hand, the oval plastic pipe 33 is cooled by a shower of water from the nozzle 612 without using the cooling bath, the lower portion (large-diameter portion) will not be sufficiently cooled and tend to have a smaller diameter ($R_1$), and in this case, too, the desired shapes and dimensions cannot be obtained.

In the second and third cooling tanks 62 and 63, the oval plastic pipe 33 is completely dipped in the cooling baths. This is because the oval plastic pipe has been cooled in the first cooling tank 61 to an extent which is not affected by the water pressure of the cooling water.

In the process of this invention, it is essential to locate the large-diameter portion of the oval plastic pipe 33 at the bottom portion. This serves to obtain a sufficient cooling effect. If the large-diameter portion is located at the upper portion, the shower does not sufficiently spread to the transitional portions.

As stated hereinabove, the process of this invention involves cooling a roughly shaped oval plastic tube extruded from an oval extruding slit or a roughly shaped oval plastic pipe obtained by extruding a plastic pipe having a circular cross section from a circular extruding slit, and correcting it gradually to have an oval cross-section, while the shape of the pipe is being adjusted by a forming tube. The cooling is done by conducting the pipe from the forming tube to a cooling tank with the large-diameter portion of the pipe situated at the lower part, dipping the large-diameter portion or both the large-diameter portion and a part of the transitional portions contiguous thereto in a cooling bath, and subjecting that part of the pipe which is out of the cooling bath (that is, the small-diameter portion and at least a part of the transitional portions) to a shower of a cooling liquid. Accordingly, the small-diameter portion and the transitional portions are free from the adverse effects of the pressure of the cooling liquid which are exerted during dipping, and oval plastic pipes having the desired shapes and sizes can be easily produced.

The following Example specifically illustrate the present invention.

EXAMPLE

Rigid polyvinyl chloride pipes having an oval cross-section were produced by using the apparatus shown in the drawings in accordance with the process steps described hereinabove.

The forming tube 5 used had four grooves in its inner circumferential surface which were maintained at reduced pressure. Immediately prior to entry into the forming tube 5, about 2 to 3 g/hr of kerosene was added dropwise on the peripheral surface of the roughly shaped oval plastic pipe 32.

The output of the pipe extruded was 240 to 250 kg/hr. The dipping depth h in the first cooling tank was 1.2 $R_1$, and the amount of water shower was 50 to 70 liters/min. The amount of the dipping water bath in the first cooling tank was 200 to 250 liters/min., and in the second and third cooling tanks, the amount of the dipping water bath was 300 to 350 liters/min.

For comparison, rigid polyvinyl chloride pipes having an oval cross-section were produced in the same way as above except that the pipe was entirely dipped in the first cooling tank without using a shower of cooling water.

The results are shown in the following table.

| Item (*2) | Specifications (*1) (outside diameter, mm) | Inside diameter of the forming tube (mm) | Rigid polyvinyl chloride pipes with an oval section | |
|---|---|---|---|---|
| | | | Invention (outside diameter, mm) | Comparison (outside diameter, mm) |
| Length of circumference | 964.0 ± 5.8 | 970.4 | 965.3 | 963.2 |
| H | 361.0 ± 2.6 | 363.0 | 361.5 | 361.7 |
| W | 247.0 ± 2.6 | 249.3 | 246.7 | 246.2 |
| $R_1$ | 123.5 ± 5.0 | 124.7 | 123.0 | 127.0 |
| $R_2$ | 66.5 ± 5.0 | 67.8 | 67.2 | 76.0 |
| $R_3$ | 351.0 ± 15 | 352.0 | 355.0 | 432.0 |
| $R_4$ | 351.0 ± 15 | 352.0 | 357.0 | 439.0 |
| t | 9.9 ± 0.7 | — | 9.8 | 9.8 |

(*1)The specifications are those set down by Sekisui Kagaku Kogyo K.K.
(*2)H, W, $R_1$, $R_2$, $R_3$, $R_4$, and t are as shown in FIG. 1.

The results in the above table demonstrate that the oval shaped rigid polyvinyl chloride pipes obtained by the process of this invention had dimensions within the specifications and the strain remaining in the pipe wall was small, but that the comparative pipes were outside the specifications and in particular, $R_3$ and $R_4$ became too large.

What is claimed is:

1. A process for producing a plastic pipe having an oval cross-sectional shape with a high dimensional precision, which comprises conducting a roughly shaped plastic pipe having an oval cross-sectional shape, which is in the softened state and composed of a large-diameter portion, a small-diameter portion and transitional portions connecting them to each other, to a cooling tank while its shape is adjusted by being passed through a forming tube with its large-diameter portion down; cooling the form-adjusted plastic pipe in the cooling tank by dipping the large-diameter portion or both the large diameter portion and a part of the transitional portions contiguous thereto in a cooling bath; and subjecting that portion of the form-adjusted plastic pipe which is out of the cooling bath to a shower of a cooling liquid.

2. The process of claim 1 wherein the roughly shaped plastic pipe in the softened state having an oval cross-sectional shape has been extruded from a die having an extrusion slit with an oval contour.

3. The process of claim 1 wherein the roughly shaped plastic pipe in the softened state having an oval cross-sectional shape is obtained by extruding a pipe having a circular cross-sectional shape from a die having an extrusion slit with a circular contour, and deforming it so that its cross-sectional shape becomes oval.

4. The process of claim 1 wherein the form-adjusted plastic pipe is dipped in the cooling bath to a depth which is 1.0 to 1.5 times the radius of curvature of its large-diameter portion.

5. The process of claim 1 wherein the form-adjusted plastic pipe is dipped in the cooling bath to a depth which is 1.2 to 1.3 times the radius of curvature of its large-diameter portion.

6. The process of claim 1 wherein the plastic pipe is a rigid polyvinyl chloride pipe.

* * * * *